(12) United States Patent
Kim et al.

(10) Patent No.: US 12,179,649 B2
(45) Date of Patent: Dec. 31, 2024

(54) ARMREST APPARATUS FOR VEHICLES

(71) Applicants: Hyundai Motor Company, Seoul (KR); Kia Corporation, Seoul (KR)

(72) Inventors: Ji Ah Kim, Seoul (KR); Min Ho Cho, Gyeonggi-do (KR); Jin Ho Hwang, Chungcheongnam-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 287 days.

(21) Appl. No.: 17/829,946

(22) Filed: Jun. 1, 2022

(65) Prior Publication Data
US 2023/0038501 A1 Feb. 9, 2023

(30) Foreign Application Priority Data
Aug. 9, 2021 (KR) .......................... 10-2021-0104410

(51) Int. Cl.
*B60N 2/75* (2018.01)

(52) U.S. Cl.
CPC .............. *B60N 2/753* (2018.02); *B60N 2/773* (2018.02)

(58) Field of Classification Search
CPC .......... B60N 2/75; B60N 2/753; B60N 2/763; B60N 2/77; B60N 2/773; B60N 2/78; B60J 5/04; B60J 5/0413; B62D 25/02
USPC ....................................................... 296/1.09
See application file for complete search history.

(56) References Cited

U.S. PATENT DOCUMENTS

| | | | | |
|---|---|---|---|---|
| 5,964,497 A * | 10/1999 | Wiles | ...................... | B60N 2/763 296/153 |
| 6,145,919 A * | 11/2000 | Mysliwiec | ............... | B60N 2/78 296/153 |
| 9,022,320 B2 * | 5/2015 | Wallace | ............. | B64D 11/0646 244/118.6 |
| 2015/0203006 A1 * | 7/2015 | Hipshier | .................. | B60N 2/78 296/153 |
| 2020/0384902 A1 | 12/2020 | Sakurai et al. | | |

FOREIGN PATENT DOCUMENTS

| | | | | |
|---|---|---|---|---|
| DE | 102009048712 A1 * | 5/2010 | .......... | B60N 2/4235 |
| JP | 2017-214043 A | 12/2017 | | |
| JP | 6738023 B2 | 8/2020 | | |
| KR | 1999-0029173 A | 4/1999 | | |
| KR | 101828746 B1 | 2/2018 | | |

OTHER PUBLICATIONS

English translation of DE 10 2009 048 712; retrieved via Patent-Translate located at www.epo.org. (Year: 2024).*

* cited by examiner

*Primary Examiner* — Jason S Daniels
(74) *Attorney, Agent, or Firm* — Fox Rothschild LLP (57) ABSTRACT

An armrest apparatus for vehicles includes a body that is combined with a mounting area provided on a side surface of an interior of a vehicle to be slidably movable and on which a passenger rests an arm. A movement guide of the apparatus protrudes from the body and is inserted into a mounting groove provided in the mounting area to guide movement of the body along the mounting groove. A mounting unit is provided in the mounting area and supports the body and fixes a position of the body withdrawn from the mounting area through sliding movement.

10 Claims, 12 Drawing Sheets

ARMREST APPARATUS FOR VEHICLES

CROSS-REFERENCE TO RELATED APPLICATION

This application claims under 35 U.S.C. § 119(a) the benefit of priority to Korean Patent Application No. 10-2021-0104410 filed on Aug. 9, 2021, the entire contents of which are incorporated herein by reference.

BACKGROUND

(a) Technical Field

The present disclosure relates to an armrest apparatus for vehicles, and more particularly, to an armrest apparatus for vehicles which enables an armrest applied to a structure, such as a sliding door trim, to be slidably moved on an inner panel to be withdrawn, to prevent occurrence of interference of the armrest with the opening and closing path of a door.

(b) Background Art

In general, a door trim is provided on a door panel of a vehicle to improve external appearance of the door panel and to prevent introduction of noise into the interior of the vehicle, and an armrest, a pull handle, a map pocket, etc. are essentially provided on the door trim to increase passenger convenience. The armrest of the door trim is provided on a side door, and is generally manufactured as a structure integrated with a handle used to open and close the door, a receipt space, a switch for driving a side door window glass, etc.

Further, the armrest generally includes an assembly of a core configured to form the overall appearance of the armrest and to have durability through coupling with the door trim, and a skin configured to surround the core and formed of a soft material. In addition, the armrest is provided inside the door trim in parallel to the driving direction of the vehicle, and is configured such that a driver or a passenger in the vehicle may put an arm on the armrest, and the handle for opening and closing the door and various pieces of convenience equipment are formed integrally with the armrest.

Recently, an attempt to change structures of vehicle door trims from a type in which a door trim is rotated about a central axis of a B-pillar of a vehicle to a type in which a sliding structure is applied to a door trim is underway. However, since an armrest in such a sliding door trim is provided inside a vehicle in parallel to the driving direction of the vehicle, when the sliding structure is applied, the armrest interferes with the operating path of a door provided in a second row, and thus, the armrest may be damaged or the door is not capable of being opened.

The above information disclosed in this section is merely for enhancement of understanding of the background of the invention and therefore it may contain information that does not form the prior art that is already known in this country to a person of ordinary skill in the art.

SUMMARY

The present invention has been made in an effort to solve the above-described problems associated with the prior art, and it is an object of the present invention to provide an armrest apparatus for vehicles in which an armrest is combined with a mounting area provided in a space for a second row seat of a vehicle through a rail so that the armrest is slidably moved in the mounting area to be selectively withdrawn in response to user operation, to prevent occurrence of interference of the armrest with the opening and closing path of a door in a structure in which the door is slidably opened and closed.

In one aspect, the present invention provides an armrest apparatus for vehicles that may include a body combined with a mounting area provided on a side surface of an interior of a vehicle to be slidably movable and configured such that a passenger may put an arm thereon, a movement guide configured to protrude from the body and inserted into a mounting groove provided in the mounting area to guide movement of the body along the mounting groove, and a mounting unit provided in the mounting area and configured to support the body and to fix a position of the body withdrawn from the mounting area through sliding movement.

In an exemplary embodiment, the body may include a main body combined with the mounting area, and a coupling member combined with a rear surface of the main body to protrude, and inserted into the mounting unit at one end of the mounting groove. In addition, the mounting unit may include a first guide groove configured to form a first path in a direction of insertion of the coupling member, a second guide groove provided to branch off from the first guide groove to extend upwards, and configured to form a second path depending on movement of the coupling member, and a third guide groove provided to branch off from the first guide groove to extend downwards, and configured to form a third path depending on movement of the coupling member.

Each of the first to third guide grooves may include an engaging area configured to have a shape corresponding to a shape of an engaged piece provided at one end of the coupling member so that the engaged piece is engaged with the inside of the engaging area. The mounting unit is configured such that the coupling member may protrude to be inserted into the second guide groove or the third guide groove, thereby adjusting a height of the main body, and the protrusion of the coupling member may be adjusted in stages.

In addition, the body may include a main body combined with the mounting area and configured to have a C-shape such that the mounting unit protruding from an inner surface of the mounting area is held therein, and an insertion member provided in the main body and selectively inserted into the mounting unit in response to sliding movement of the main body. The insertion member may be formed of a magnetic material, and a position of the insertion member inserted into the mounting unit may be fixed by magnetic combination between the insertion member and a magnet provided in the mounting unit.

The insertion member may be combined with a head of the mounting unit, as the insertion member is inserted into the mounting unit, and an extension member connected to the head may be received in an angle adjustment guide provided in the main body, as the main body is rotated about the insertion member to adjust an angle of the main body. The body may further include a fixing member in a folded state mounted on one surface of the main body, unfolded from the folded state due to a weight thereof to protrude, and inserted into an insertion recess provided in an inner surface of the mounting area, as the angle of the main body is adjusted through rotation of the main body. In addition, the fixing member may be configured such that a length thereof selectively extends towards the insertion.

Other aspects and preferred embodiments of the invention are discussed infra.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Advantages and features of the present invention and methods for achieving them will become apparent from the descriptions of aspects herein below with reference to the accompanying drawings and the embodiments.

However, the present invention is not limited to the embodiments disclosed herein but may be implemented in various different forms. The embodiments are provided to make the description of the present invention thorough and to fully convey the scope of the present invention to those skilled in the art. It is to be noted that the scope of the present invention is defined only by the claims. Further, in the following description of the present invention, a detailed description of known functions and configurations incorporated herein will be omitted when it may make the subject matter of the present invention rather unclear.

Figure 1:
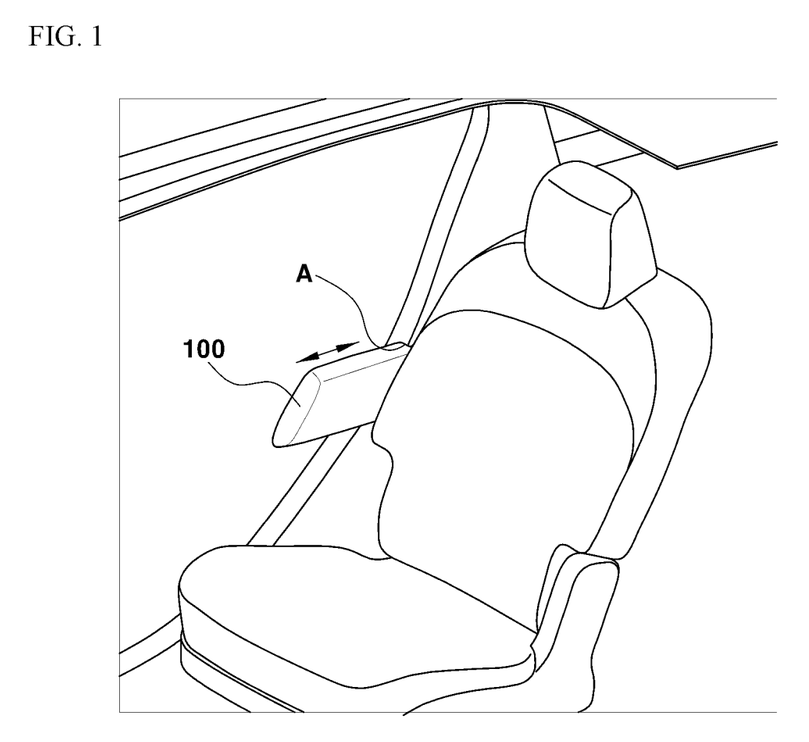
FIG. 1 is a perspective view illustrating the mounted position of an armrest apparatus for vehicles according to one embodiment of the present invention.
Figure 2A:
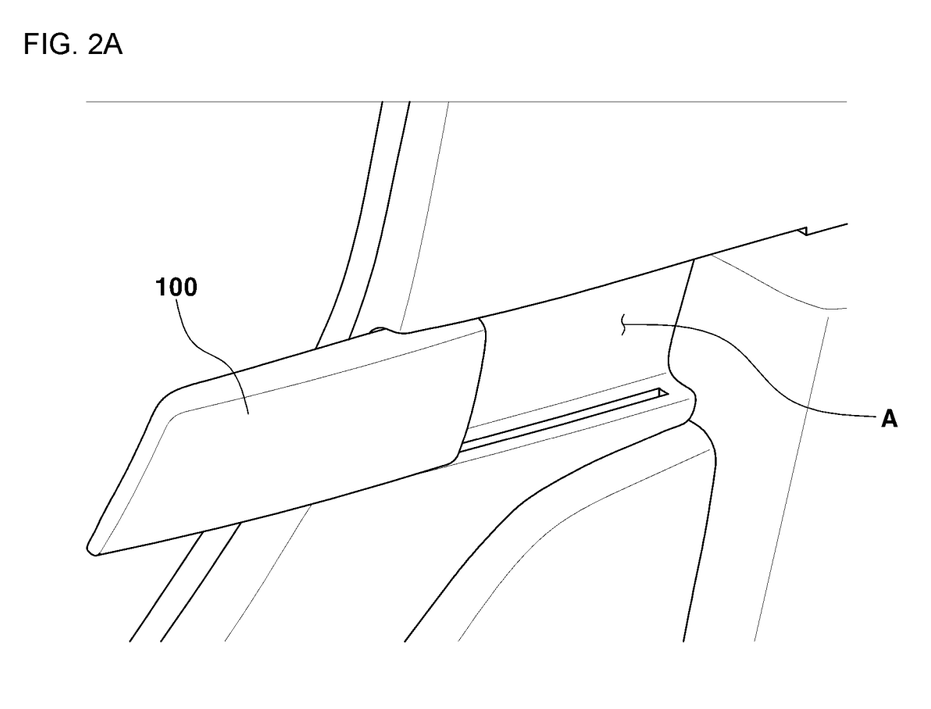
FIGS. 2A and 2B are views illustrating the combined structure of a body of the armrest apparatus for vehicles according to one embodiment of the present invention.
Figure 2B:
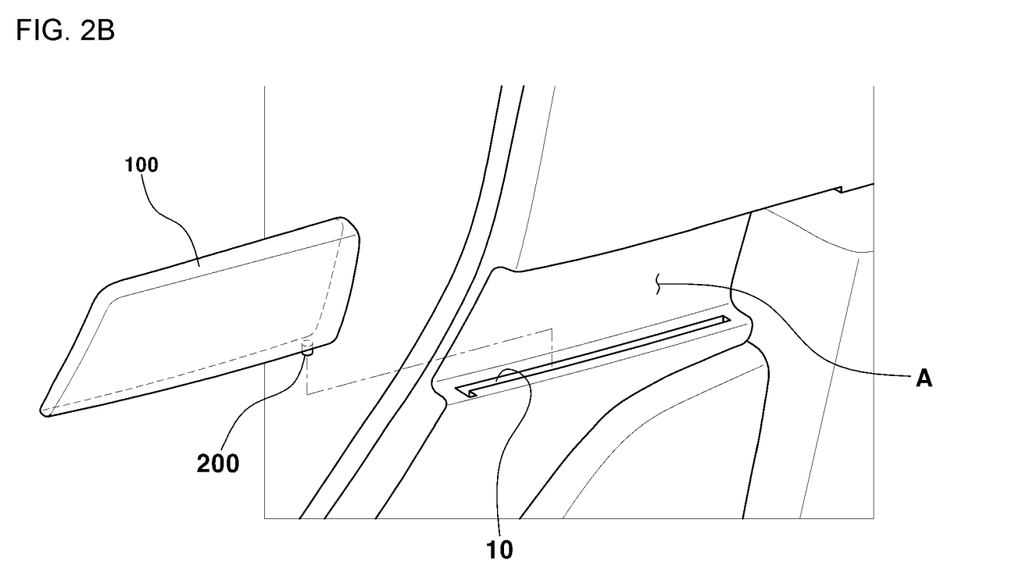
Figure 3A:
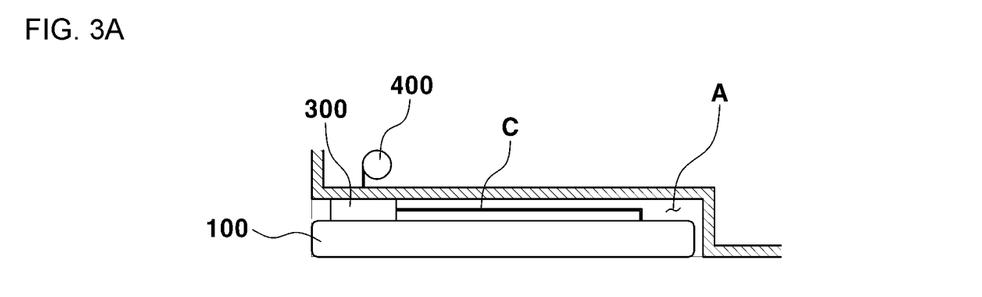
FIGS. 3A and 3B are views illustrating sliding movement of the body of the armrest apparatus for vehicles according to one embodiment of the present invention.
Figure 3B:
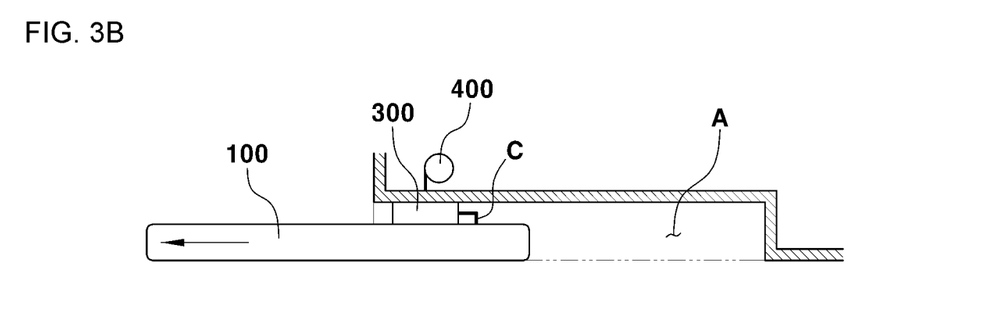

FIG. 1 is a perspective view illustrating the mounted position of an armrest apparatus for vehicles according to one embodiment of the present invention, FIGS. 2A and 2B are views illustrating the combined structure of a body of the armrest apparatus for vehicles according to one embodiment of the present invention, and FIGS. 3A and 3B are views illustrating sliding movement of the body of the armrest apparatus for vehicles according to one embodiment of the present invention.

Figure 4:
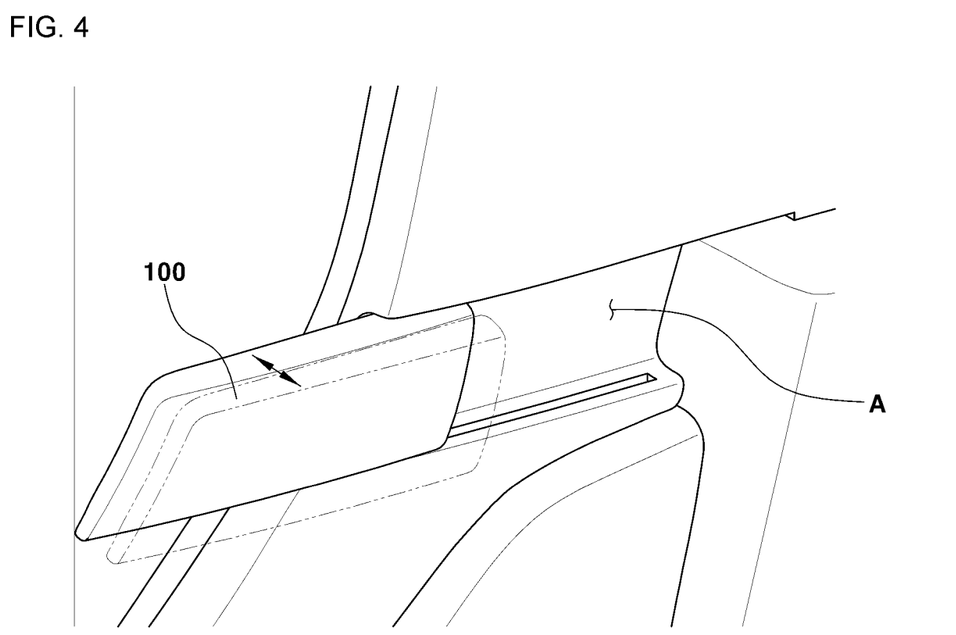
FIG. 4 is a view illustrating the protruding position of the body of the armrest apparatus for vehicles according to one embodiment of the present invention.
Figure 5A:
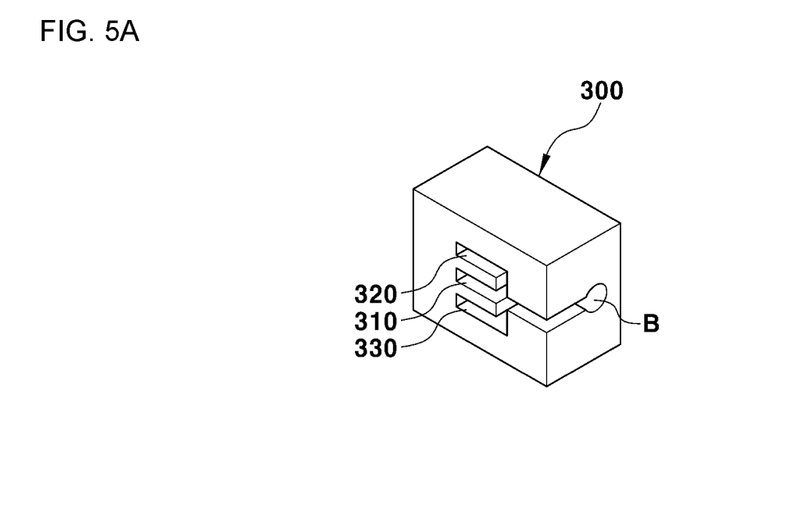
FIGS. 5A and 5B are views illustrating combination relations between the body and a mounting unit in the armrest apparatus for vehicles according to one embodiment of the present invention.
Figure 5B:
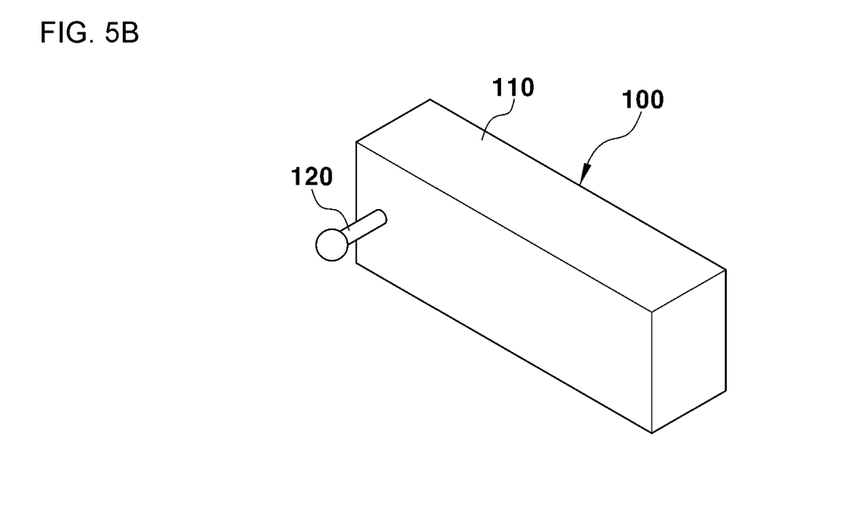

Further, FIG. 4 is a view illustrating the protruding position of the body of the armrest apparatus for vehicles according to one embodiment of the present invention, and FIGS. 5A and 5B are views illustrating combination relations between the body and a mounting unit in the armrest apparatus for vehicles according to one embodiment of the present invention.

Figure 6:
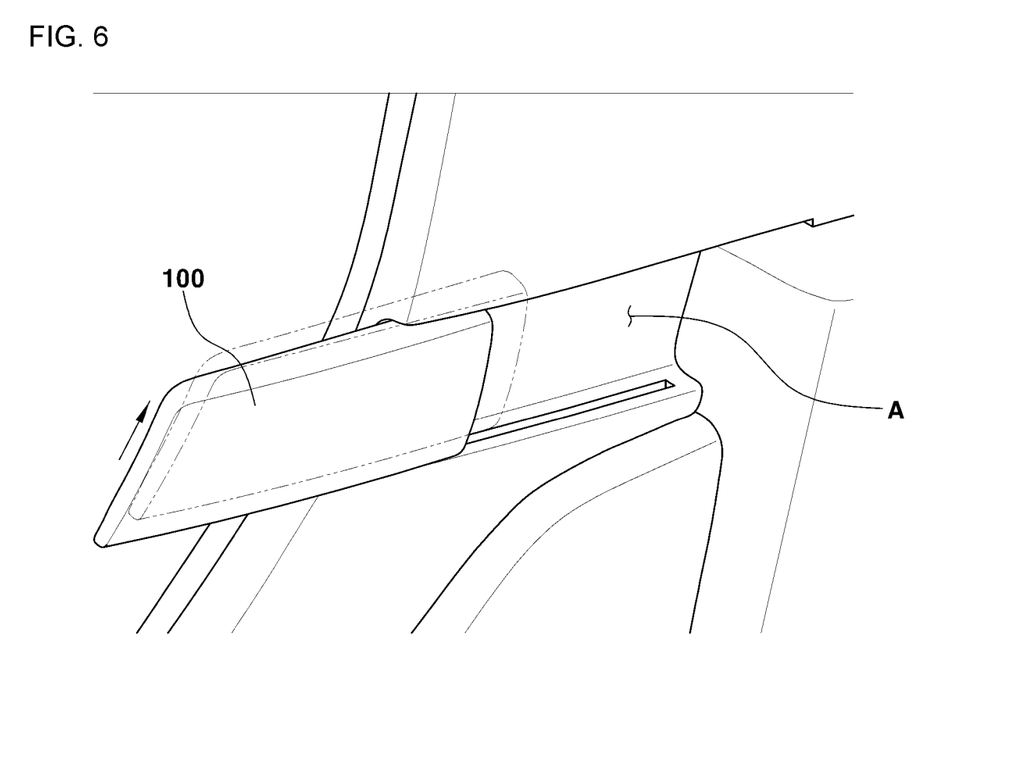
FIG. 6 is a view illustrating movement of the body in the upward and downward directions in the armrest apparatus for vehicles according to one embodiment of the present invention.
Figure 7:
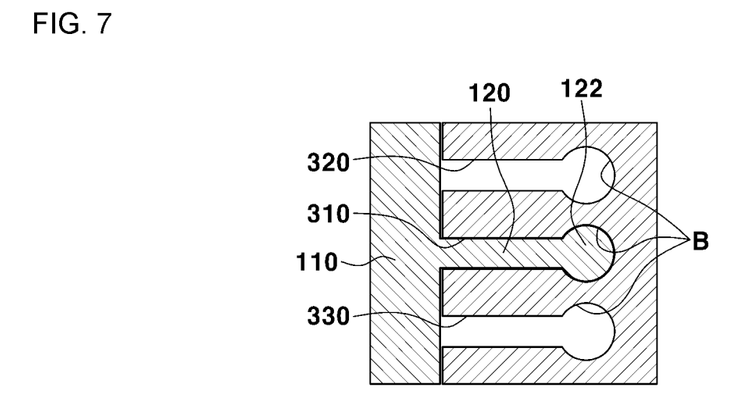
FIG. 7 is a view illustrating the inserted state of a coupling member into the armrest apparatus for vehicles according to one embodiment of the present invention.
Figure 8:
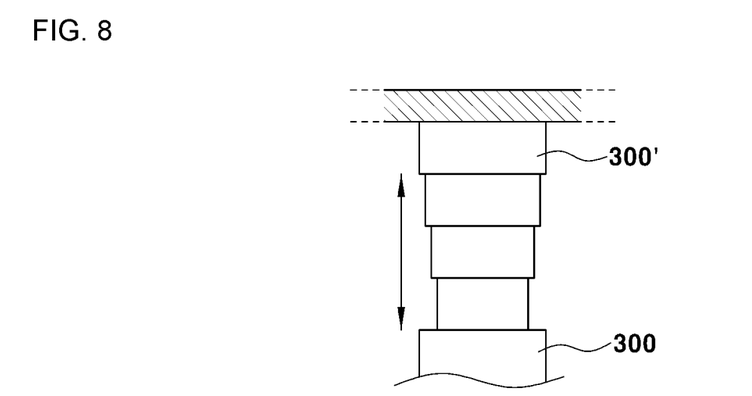
FIG. 8 is a view illustrating extension of the mounting unit in the armrest apparatus for vehicles according to one embodiment of the present invention.

Moreover, FIG. 6 is a view illustrating movement of the body in the upward and downward directions in the armrest apparatus for vehicles according to one embodiment of the present invention, FIG. 7 is a view illustrating the inserted state of a coupling member into the armrest apparatus for vehicles according to one embodiment of the present invention, and FIG. 8 is a view illustrating extension of the mounting unit in the armrest apparatus for vehicles according to one embodiment of the present invention.

Recently, as an attempt to change structures of doors from a type in which a door is rotated about a central axis of a B-pillar of a vehicle to a type in which a sliding structure is applied to a door without a B-pillar is underway, when an armrest is installed on a door provided in a second row as in the conventional armrest, the armrest may interfere with the operating path of the door, and thus, the armrest may be damaged and thereby the door is not capable of being opened.

Accordingly, as shown in FIGS. 1 to 3, the armrest apparatus according to this embodiment may include a body 100, a movement guide 200, and a mounting unit 300. The body 100 may be slidably combined with a mounting area A provided inside a space for a second row seat of a vehicle and configured to have a C-shape. The body 100 may be formed to have a designated or predetermined width and length, and may be withdrawn towards the space for the second row seat of the vehicle, as shown in FIG. 2A, to allow a user may put or rest an arm thereon.

Further, the movement guide 200 may protrude from the lower part of the body 100 to a designated length, as shown in FIG. 2B. Such a movement guide 200 may be inserted into a mounting groove 10 formed in the mounting area A and having an L-shaped cross-section, and thus may guide movement of the body 100 along the mounting groove 10. When mounting grooves 10 are formed in the upper and lower regions of the mounting area A opposite each other, movement guides 200 may also be provided in a pair on the upper and lower portions of the body 100.

The mounting unit 300 may be disposed in the mounting area A, and may support the body 100. The mounting unit 300 may be slidably moved in the mounting area A, and thus fix the position of the body 100 withdrawn towards the space for the second row seat, as shown in FIGS. 3A and 3B. A roller part 400 on which a cable C is wound may be provided inside the mounting area A (with reference to FIGS. 3A and 3B), and the roller part 400 enables the cable C to be wound on thereon such that the cable C maintains a designated tension, when the body 100 connected to the cable C is slidably moved, thereby being capable of preventing the body 100 from being released from the mounting area A during sliding movement of the body 100.

Further, as shown in FIG. 4, the body 100 may protrude towards the inside of the space for the second row seat of the vehicle, thereby allowing a passenger sitting on the second row seat to effectively put or place an arm on the body 100. For this purpose, the body 100 may include, as shown in FIG. 5B, a main body 110 and a coupling member 120, and correspondingly, the mounting unit 300 may include a plurality of guide grooves 310 to 330. In other words, the main body 110 may be combined with the mounting area A, and the coupling member 120 may be combined with the rear surface of the main body 110 to protrude, and may be selectively inserted into the guide groove 310 as the main body 110 is slidably moved to one end of the mounting groove 10 to be withdrawn.

Additionally, the mounting unit 300 may include a first guide groove 310, a second guide groove 320 and a third guide groove 330 to be movable in the upward and downward (vertical) directions of the body 100, as shown in FIG. 6. The first guide groove 310 forms a first path in a direction of insertion of the coupling member 120. Further, the second guide groove 320 branches off from the first guide groove 310 to extend upwards, as shown in FIG. 5A, and forms a second path based on movement of the coupling member 120.

Moreover, the third guide groove 330 branches off from the first guide groove 310 to extend downwards, and forms a third path based on movement of the coupling member 120. Each of the first to third guide grooves 310 to 330 may include an engaging area B configured to have a shape corresponding to the shape of an engaged piece 122 provided at one end of the coupling member 120 so that the engaged piece 122 is engaged with the inside of the engaging area B, that is to say, configured to have an expanded shape.

Therefore, the first to third guide grooves 310 to 330 formed in the mounting unit 300 to be divided from one another are configured such that the coupling member 120 is engaged with the inside of one of the first to third guide grooves 310 to 330 when the body 100 is slid to be withdrawn, thereby being capable of guiding withdrawal of the body 100, and fixing the withdrawn position and height of the body 100 together with the roller part 400 (with reference to FIG. 7).

Based on the above-described structure, sliding movement of the body 100 and movement of the body 100 in the upward and downward directions will be described below. As the main body 110 slides from a first end to a second end of the mounting area A, when the coupling member 120 reaches the mounting unit 300, the coupling member 120 is inserted into the first guide groove 310 to be engaged therewith and is then moved to the end of the first guide groove 310, and thereby, the withdrawn position of the body 100 may be fixed (with reference to FIG. 7).

In this state, to increase the height of the main body 110, as shown in FIG. 6, the coupling member 120 is retreated to the position at which the second guide groove 320 branches off from the first guide groove 310, and is then moved along the second guide groove 320, thereby enabling the height of the main body 110 to be adjusted. Since the main body 110 is in the state of being inserted into the mounting area A, when the height of the main body 110 is adjusted upwards in this state, the main body 110 interferes with the upper or lower regions of the mounting area A and thus causes difficulty in adjusting the height of the main body 110, and therefore, the main body 110 may selectively protrude from the mounting area A towards the inside of the space for the second row seat of the vehicle.

In other words, another mounting unit 300' having a multistage structure (for example, formed in a bellows type) may be additionally provided to make a pair with the mounting unit 300, as shown in FIG. 8, and when the main body 110 is pulled using the structure having the mounting units 300 and 300', the mounting unit 300' may be extended in stages and thus the main body 110 combined with the mounting unit 300 may protrude from the mounting area A towards the inside of the space for the second row seat of the vehicle. Therefore, to adjust the height of the main body 110, the main body 110 may first be pulled to protrude from the mounting area A, and then, the coupling member 120 may be moved from the first guide groove 310 to the second guide groove 320 or the third guide groove 330 to adjust the height of the main body 110 vertically.

Particularly, since the mounting unit 300' extends in stages, the main body 110 may protrude further from the position thereof for adjusting the height of the main body 110 due to extension of the mounting unit 300' in the mounting are A, and such an operation may be performed simultaneously with adjustment of the height of the main body 110, thereby enabling a passenger sitting on the second row seat of the vehicle to use the armrest at a designated height and position and thus improving convenience in use.

Figure 9:
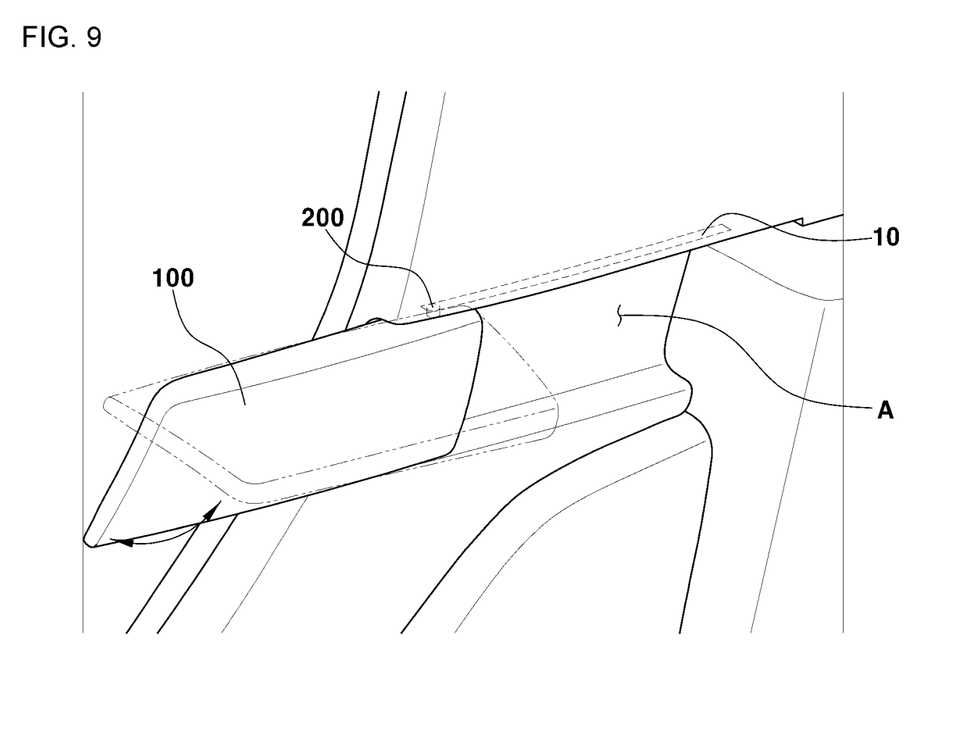
FIG. 9 is a view illustrating the combined structure of a body in an armrest apparatus for vehicles according to another embodiment of the present invention.
Figure 10A:
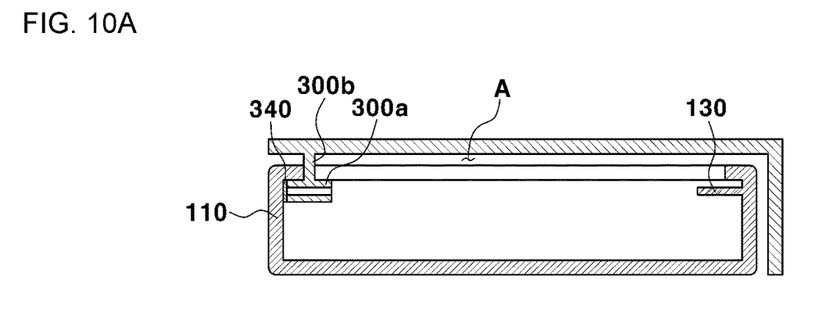
FIGS. 10A to 10C are views illustrating sliding movement of the body of the armrest apparatus for vehicles according to another embodiment of the present invention.
Figure 10B:
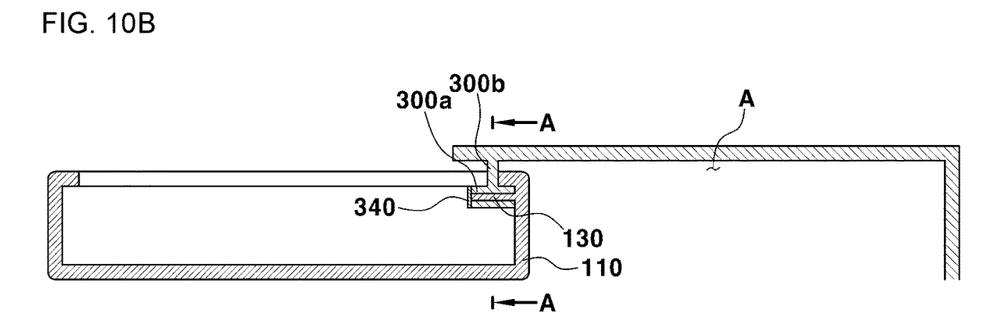
Figure 10C:
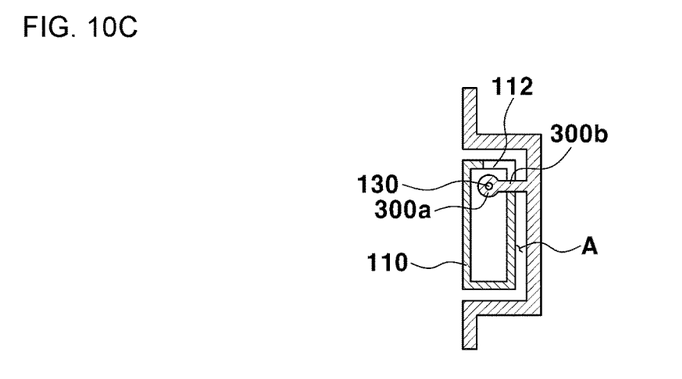
Figure 11:
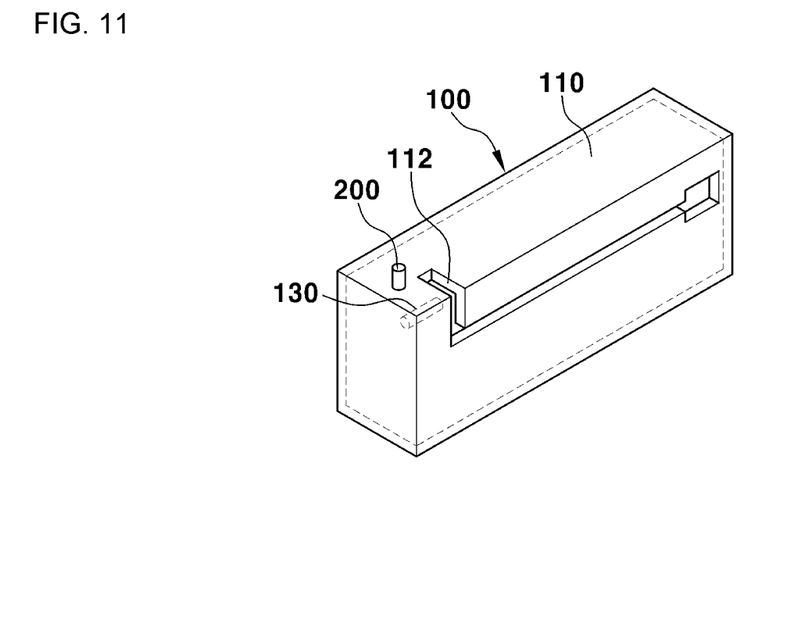
FIG. 11 is a view illustrating an angle adjustment guide of the armrest apparatus for vehicles according to another embodiment of the present invention.

Hereinafter, FIG. 9 is a view illustrating the combined structure of a body in an armrest apparatus for vehicles according to another embodiment of the present invention, FIGS. 10A to 10C are views illustrating sliding movement of the body of the armrest apparatus for vehicles according to another embodiment of the present invention, and FIG. 11 is a view illustrating an angle adjustment guide of the armrest apparatus for vehicles according to another embodiment of the present invention.

Figure 12:
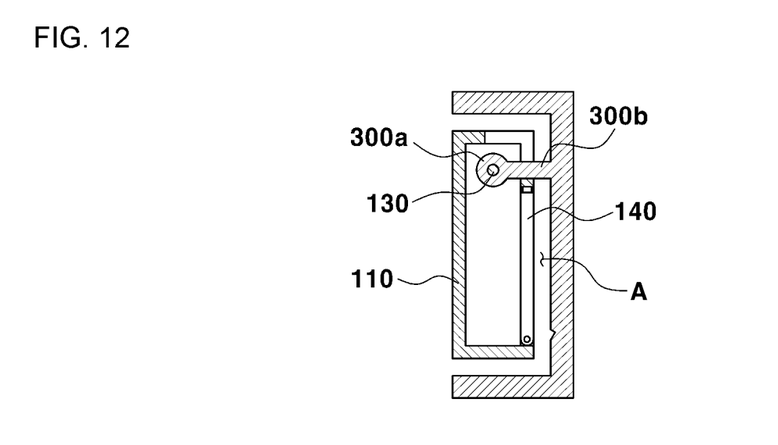
FIG. 12 is a view illustrating the initial state of the body of the armrest apparatus for vehicles according to another embodiment of the present invention.
Figure 13A:
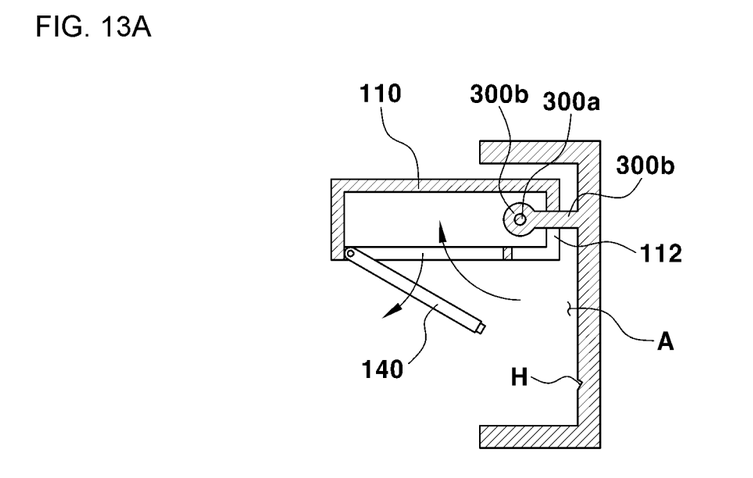
FIGS. 13A and 13B are views illustrating the rotated state of the body of the armrest apparatus for vehicles according to another embodiment of the present invention.
Figure 13B:
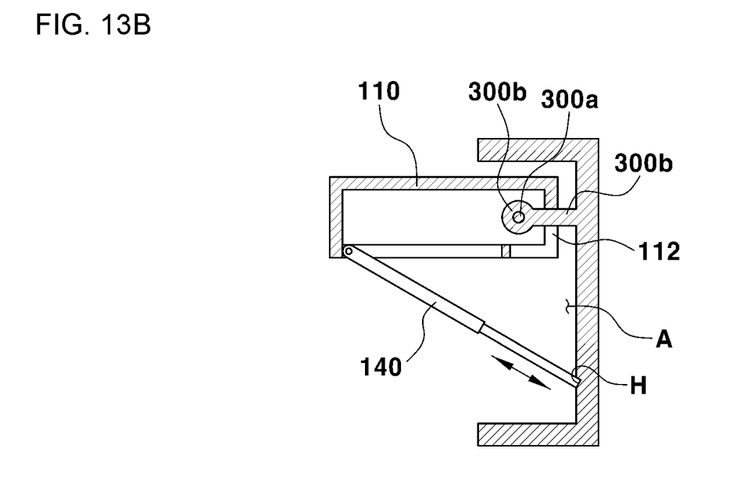

Further, FIG. 12 is a view illustrating the initial state of the body of the armrest apparatus for vehicles according to another embodiment of the present invention, and FIGS. 13A and 13B are views illustrating the rotated state of the body of the armrest apparatus for vehicles according to another embodiment of the present invention. The body 100 of the armrest apparatus for vehicles according to this embodiment may be rotated so that the angle thereof is adjustable, as shown in FIG. 9, and for this purpose, may include a main body 110 and an insertion member 130.

The main body 110 is configured such that a movement guide 200 is inserted into a mounting groove 10 provided in the upper region of the mounting area A, and may be slidably moved along the mounting groove 10, as shown in FIG. 9 The main body 110 may be formed to have a C-shape, and thus slidably moved in the length direction of the mounting groove 10 in the state in which a mounting unit 300 configured to protrude from the inner surface of the mounting area A is held in the main body 110 and the movement guide 200 may be inserted into the mounting groove 10, as shown in FIG. 10C.

Further, the insertion member 130 may be formed to protrude from the inner surface of the main body 110, as shown in FIG. 10A, and may be selectively inserted into the mounting unit 300 in response to sliding movement of the main body 110, as shown in FIG. 10B, thereby combining the main body 110 and the mounting unit 300 with each other. In particular, the insertion member 130 may be formed of a magnetic material, and thus, the position of the insertion member 130 inserted into the mounting unit 300 may be fixed by magnetic combination between the insertion member 130 and a magnet 340 provided in the mounting unit 300.

In other words, the main body 110 may be combined with a head 300a of the mounting unit 300, as the insertion member 130 of the main body 110 is inserted into the mounting unit 300, and an extension member 300b extending from the mounting area A and connected to the head 300a may be received in an angle adjustment guide 112 provided in the main body 110, as shown in FIG. 11, as the main body 110 is rotated about the insertion member 130. When the main body 10 is slidably moved in the mounting area A, the insertion member 130 reaches the position of the mounting unit 300, and thus, when the extension member 300b coincides with the position of the angle adjustment guide 112, as shown in FIG. 10B, the angle of the main body 110 may be adjusted by lifting up the main body 110 about the insertion member 130 so that the extension member 300b may be received in the angle adjustment guide 112 through an opening thereof.

Particularly, the body 100 may further include a fixing member 140, and the fixing member 140 in the folded state is mounted on one surface of the main body 110, as shown in FIGS. 13A and 13B. As the angle of the main body 110 is adjusted by lifting the main body 110, as described above, the fixing member 140 may be unfolded from the folded state due to the weight thereof to protrude downwards, and may be inserted into an insertion recess H provided in the inner surface of the mounting area A.

Further, the fixing member 140 may have a length, which selectively extends towards the insertion recess H, and may be fixed and, when the fixing member 140 folded to have a comparatively short length in the main body 110 is unfolded, the folding member 140 may extend to have a comparatively long length to reach the insertion recess H, thereby being capable of effectively fixing the position of the main body 110, the angle of which is adjusted.

As described above, the armrest apparatus for vehicles according to the present invention allows an armrest to be combined with a mounting area provided in a space for a second row seat of a vehicle through a rail so that the armrest is slidably moved in the mounting area to be selectively withdrawn in response to user operation, thereby being capable of preventing occurrence of interference of the armrest with the opening and closing path of a door in a structure in which the door is slidably opened and closed.

Further, in sliding movement of the armrest in the mounting area, the mounting units may extend and protrude towards the inside of the space for the second row seat, thereby enabling the position of the armrest in the vertical directions to be adjusted outside the mounting area. In addition, the angle of the armrest in the vertical directions may be adjusted in the state in which the armrest is withdrawn towards the inside of the space for the second row seat, and thus, the armrest apparatus for vehicles may support a user arm throughout a larger area, thereby being capable of improving convenience in use of the armrest apparatus for vehicles.

As is apparent from the above description, an armrest apparatus for vehicles according to the present invention allows an armrest to be combined with a mounting area provided in a space for a second row seat of a vehicle through a rail so that the armrest is slidably moved in the mounting area to be selectively withdrawn in response to user operation, thereby being capable of preventing occurrence of interference of the armrest with the opening and closing path of a door in a structure in which the door is slidably opened and closed.

Further, in sliding movement of the armrest in the mounting area, mounting units are configured to extend and protrude towards the inside of the space for the second row seat, thereby enabling the position of the armrest in the vertical directions to be adjusted outside the mounting area.

In addition, the angle of the armrest in the vertical directions may be adjusted in the state in which the armrest is withdrawn towards the inside of the space for the second row seat, and thus, the armrest apparatus for vehicles may support a user arm throughout a larger area, thereby being capable of improving convenience in use of the armrest apparatus for vehicles.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. An armrest apparatus for vehicles, comprising:
    a body combined with a mounting area provided on a side surface of an interior of a vehicle to be slidably movable, and on which a passenger rests an arm;
    a movement guide that protrudes from the body and is inserted into a mounting groove provided in the mounting area to guide movement of the body along the mounting groove; and
    a mounting unit disposed in the mounting area and configured to:
        support the body, and
        fix a position of the body withdrawn from the mounting area through sliding movement by allowing the body to be inserted therein.

2. The armrest apparatus for vehicles of claim 1, wherein the body includes:
    a main body combined with the mounting area; and
    a coupling member combined with a rear surface of the main body to protrude, and inserted into the mounting unit at one end of the mounting groove.

3. The armrest apparatus for vehicles of claim 2, wherein the mounting unit includes:
    a first guide groove that forms a first path in a direction of insertion of the coupling member;

a second guide groove that branches off from the first guide groove to extend upwards, and forms a second path depending on movement of the coupling member; and a third guide groove that branches off from the first guide groove to extend downwards, and forms a third path depending on movement of the coupling member.

4. The armrest apparatus for vehicles of claim 3, wherein each of the first to third guide grooves includes an engaging area having a shape that corresponds to a shape of an engaged piece provided at one end of the coupling member to engage the engaged piece with the inside of the engaging area.

5. The armrest apparatus for vehicles of claim 3, wherein the coupling member protrudes to be inserted into the second guide groove or the third guide groove, thereby adjusting a height of the main body, and the protrusion of the coupling member is adjusted in stages.

6. The armrest apparatus for vehicles of claim 1, wherein the body includes:

a main body combined with the mounting area and having a C-shape such that the mounting unit protruding from an inner surface of the mounting area is held therein; and an insertion member disposed in the main body and selectively inserted into the mounting unit in response to sliding movement of the main body.

7. The armrest apparatus for vehicles of claim 6, wherein the insertion member is formed of a magnetic material, and a position of the insertion member inserted into the mounting unit is fixed by magnetic combination between the insertion member and a magnet provided in the mounting unit.

8. The armrest apparatus for vehicles of claim 6, wherein:

the insertion member is combined with a head of the mounting unit, as the insertion member is inserted into the mounting unit; and an extension member connected to the head is received in an angle adjustment guide provided in the main body, as the main body is rotated about the insertion member to adjust an angle of the main body.

9. The armrest apparatus for vehicles of claim 8, wherein the body further includes:

a fixing member in a folded state mounted on one surface of the main body, unfolded from the folded state due to a weight thereof to protrude, and inserted into an insertion recess provided in an inner surface of the mounting area, as the angle of the main body is adjusted through rotation of the main body.

10. The armrest apparatus for vehicles of claim 9, wherein the fixing member has a length that selectively extends towards the insertion.

* * * * *